(12) United States Patent
Vandroux et al.

(10) Patent No.: US 6,594,438 B1
(45) Date of Patent: Jul. 15, 2003

(54) DISPLAYING PHOTOGRAPHS ON A TELEVISION SCREEN USING A VIDEOCASSETTE RECORDER

(75) Inventors: Jean-Philippe Vandroux, Crissey (FR); Thierry Vachette, Esbarres (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/399,015

(22) Filed: Sep. 21, 1999

(30) Foreign Application Priority Data

Dec. 18, 1998 (FR) .............................. 98 16281

(51) Int. Cl.⁷ .......................... H04N 5/76; H04N 7/00; H04N 5/91
(52) U.S. Cl. .......................... 386/46; 386/117; 386/118
(58) Field of Search .......................... 386/46, 107, 95, 386/108, 117, 118, 127, 131, 128, 129, 1, 38, 42; 348/64, 222.1; H04N 7/00, 5/76, 5/91

(56) References Cited

U.S. PATENT DOCUMENTS

| | | | |
|---|---|---|---|
| 3,917,144 A | * | 11/1975 | Finnemore |
| 4,587,572 A | * | 5/1986 | DiGiulio |
| 4,761,694 A | * | 8/1988 | Shudo et al. |
| 5,025,331 A | | 6/1991 | Hirayama et al. |
| 5,280,400 A | | 1/1994 | Staub |
| 5,587,853 A | | 12/1996 | Tai |

FOREIGN PATENT DOCUMENTS

| | | |
|---|---|---|
| EP | 0 581 241 A | 2/1994 |
| EP | 0 804 020 A | 10/1997 |

* cited by examiner

*Primary Examiner*—Robert Chevalier

(57) ABSTRACT

The adapter cassette comprises: a) means 12 to receive a reel on which is wound a strip of photographic film having photographic images recorded thereon; b) transport means 22 run by the operation of a VCR loaded with the adapter cassette to control the position of the strip of film at least partially wound on the reel in relation to an analysis position; and c) means for analysis 30 and transformation 38 of the signal to provide a video signal representing the image stored on the strip of film and located in front of the analysis position.

9 Claims, 2 Drawing Sheets

DISPLAYING PHOTOGRAPHS ON A TELEVISION SCREEN USING A VIDEOCASSETTE RECORDER

CROSS-REFERENCE TO RELATED APPLICATIONS

The present application is based on French Application Serial Number 9816281, filed Dec. 18, 1998, by Jean Philippe Vandroux and Thierry Vachette.

FIELD OF THE INVENTION

The invention relates to the display of photographs on a television screen and especially to a video cassette recorder (VCR), such as for example VHS®, enabling the display by means of a conventional commercial VCR of photographs recorded on a strip of film wound on a spool or reel such as for example photographs in APS® format.

BACKGROUND OF THE INVENTION

The display of photographs on a television screen is known. To be able to display photographs on a television screen, up to now, has required the use of a specific device that transforms, by scanning the images, usually negatives, into an electrical signal that is sent to a television screen after having transformed the signal into a signal suitable for television. This practice is relatively cumbersome as the device has a significant size and many functions are required.

It has been noticed that many television users also have a VCR. In these conditions, the inventors decided to be able to benefit from the VCR controls to be able to reduce the cost and size of a film strip reader to be able to display photographs on a television screen.

U.S. Pat. No. 5,025,331, titled "Tape Casette Loading System Compatible With Two Different Sized Cassettes," by Hirayama et al., Jun. 18, 1991, describes a VCR that can receive two types of cassettes of different sizes. U.S. Pat. No. 5,280,400, titled "Microcassette To Standard Cassette Adapter," by Staub, Jan. 18, 1994, describes a magnetic tape adapter cassette enabling a smaller size magnetic tape cassette to be inserted in a larger size magnetic tape cassette. U.S. Pat. No. 5,587,853, titled "Manually Operated Video Cassette Adapter," by Tai, Dec. 24, 1996, describes a VHS® format adapter videocassette able to receive a smaller VHS-C® videocassette.

The invention offers to provide a small sized device, for example of the standard size of a VHS® cassette.

The invention further offers to provide a cheap device useable in commercial VCRs, for example VHS® type.

SUMMARY OF THE INVENTION

The device according to the invention can be inserted into a VCR and enable the display of images recorded on a strip of photographic film wound on a spool or reel. The device comprises: a) means to load a reel on which is wound a strip of photographic film having photographic images recorded thereon; b) transport means controlled by the operation of the VCR to unwind and rewind the strip of film wound on the reel and move this strip in an indexed way in relation to an analysis position; c) analysis means to provide a video signal of the image stored on the strip of film and located in front of the analysis position.

The invention further aims at a new type of VCR adapted to receiving a cassette provided with a recognition means and connection means. The VCR comprising: a) a detector of the recognition means carried by the cassette; and b) a connection means for, when the cassette is introduced into the VCR, linking up the connection means of the cassette and those of the VCR to direct the control signals of the VCR to the cassette, the cassette comprising: a) means to receive a reel on which is wound a strip of photographic film having photographic images recorded thereon; b) transport means controlled by the operation of the VCR to unwind and rewind the strip of film wound on the reel and move this strip in an indexed way in relation to an analysis position; c) analysis means to provide a video signal of the image stored on the strip of film and located in front of the analysis position.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
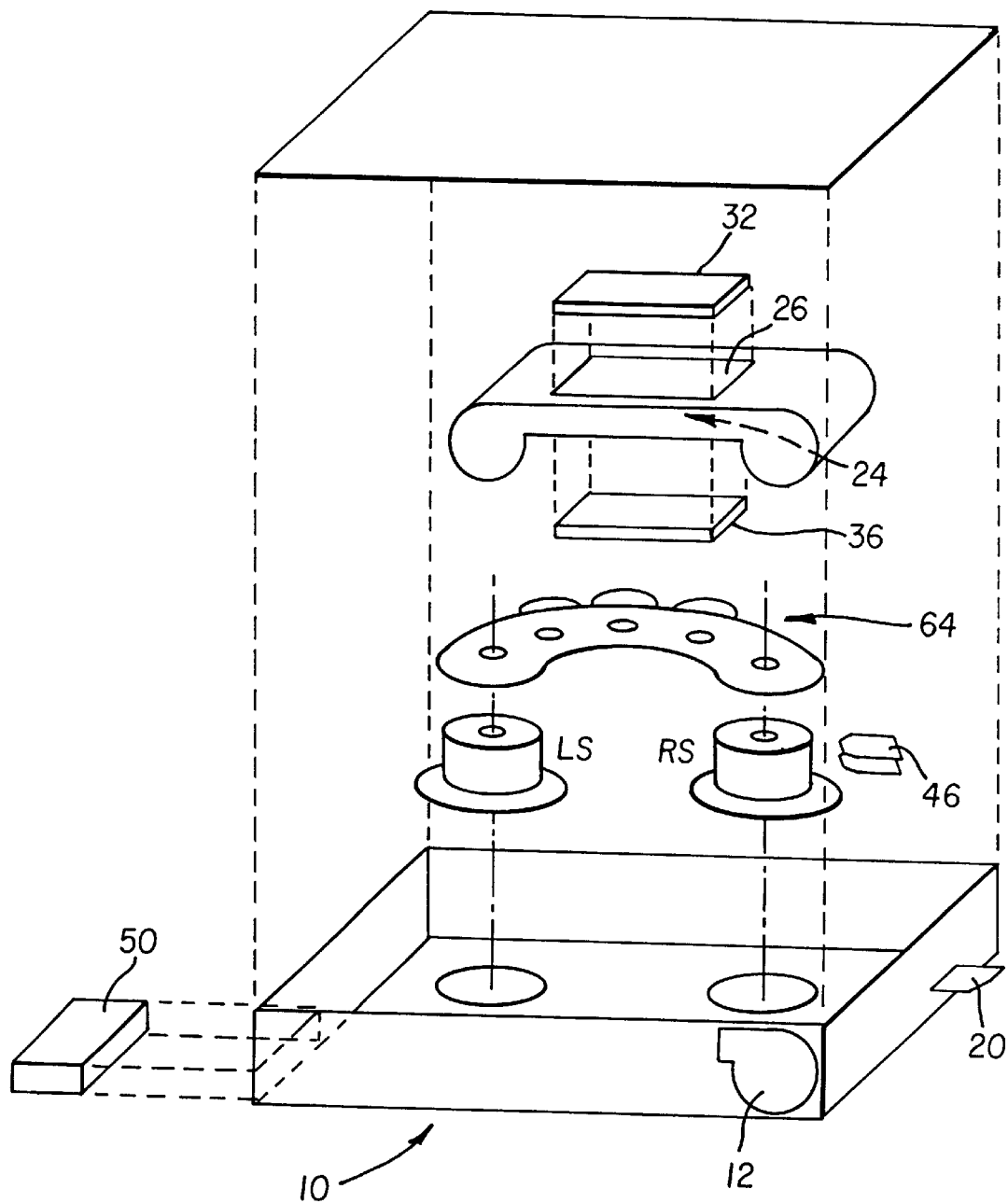
FIG. 1 represents a cut-away of the device according to the invention.

The following is a detailed description of the preferred embodiments of the invention, reference being made to the drawings in which the same reference numerals identify the same elements of structure in each of the several figures. While the description that follows is done in liaison with a particular embodiment linked to a particular standard, VHS, it is clear that the same approach can be followed with VCRs using other formats such as for example, Betamax® or other. The operation of VCRs will not be explained as the device according to the invention essentially seeks to use the VCR's remote control to limit the cost of the device by avoiding the duplication of its functions.

After having introduced the strip of film, on which the photographs to be displayed are recorded, in a suitable loading slot 12 of a device 10 according to the invention, the type of film having been used for recording is identified by means of a switch 14 that shows whether the views were recorded on negative film or on positive film. Then, the device 10 according to the invention, also hereafter called the adapter cassette, is introduced into the VCR. In a cheap embodiment that is independent of the type of VCR, the adapter cassette is provided with an electrical connecting means 16, such as for example a coaxial cable, leaving the VCR by the opening for loading cassettes and enabling the adapter cassette to be linked to the television set.

In the preferred embodiment, the adapter cassette 10 has the shape and dimensions of a VHS® cassette and the VCR used is a VHS® VCR. The external dimensions of the adapter cassette 10 have to satisfy certain dimensions and characteristics of standard NF EN 60774-1 relating to VHS videotape cassettes. The strip of film is contained in a cartridge that has the shape of an APS® cartridge. Information on the subject of the APS® format can be found on the Internet® Kodak® site at www.Kodak.com. The output signal is transmitted to the television by a coaxial cable coming from the adapter cassette 10 and leaving the VCR case by the opening for loading the cassettes in the VCR.

It is clear that VCRs are supplied with safety systems enabling the detection of various operational faults or anomalies due to the introduction of a defective cassette. Those skilled in the art will be able to allow for these safety systems to prevent stopping the operation of the VCR when the adapter cassette 10 according to the invention is introduced and design a new type of VCR that can also be used to display, on a television screen, photographic views recorded on the films contained in APS® type cartridges. It is clear that it would be easy to design a new type of VCR capable of recognizing the type of cassette introduced, for example by means of a foolproofing device. Clearly the cassette and the VCR can in this case be adapted so that they are fitted with connection means. On introducing the cassette in the VCR, the connection means interact and the VCR can send control information directly to the adapter cassette 10. Further, the video display information generated by the cassette can be sent automatically to the television by the existing liaison linking the VCR to the television.

However, in the preferred embodiment, the adapter cassette 10 will allow for current safety systems used in actual VCRs to be able to be used directly by most potential users having a VHS® type VCR. With VCRs, when they detect an operational anomaly, they go into a "standby" operational mode wherein the two spindles for driving the spools do not rotate.

Among the safety devices used on most VHS® VCRs, the inventors noticed that conventional cassettes should have a hinged shutter protecting the magnetic tape. As the device according to the invention does not operate with magnetic tape it would not require this shutter. However, the absence of this shutter makes it impossible to put the cassette into the VCR. To be able to introduce the adapter cassette in the VCR, this shutter has been conserved even though it does not interact directly with the various components of the invention.

Conventional cassettes have a location on the lower panel into which, on introducing the cassette into the VCR, a light source solid with the VCR and supplied by the VCR penetrates; this location has to be conserved to prevent damage to the VCRs. The side panels of conventional cassettes each have an opening to permit a detector located inside the VCR to detect the start or end of the tape, which has a transparent leader, by the transmission of a light pencil coming from the source mentioned above. Clearly when introducing the adapter cassette 10 according to the invention the light coming from the source should be prevented from exciting the sensors detecting the end of the tape, which would cause the VCR to stop.

Conventional cassettes have two spools, RS and LS, on which the magnetic tape is wound. VCR safety systems check the non-independence of rotation of the drive axes of these spools to detect any malfunctioning due to cassette faults and the tape breaking. The adapter cassette will thus comprise a winding spool and an unwinding spool interlinked by a kinematic chain 64. The shape and dimensions of the spools will satisfy the relevant parts of the previously mentioned standard. In a preferred embodiment, as kinematic chain 64, an odd number of toothed wheels is used to drive the unwinding spool when the winding spool is rotating to prevent the stop of the VCR. However, it has been noticed that on some VHS® VCR, when the cassette eject command is used, the left spool LS rotates backwards while the right spool RS is braked, to tension the tape. When the mechanical linkage between the spools is too high, the logic used by the VCR detects a fault as it should be necessary to wind the tape, which introduces a delay between the backwards rotation of the spool and the driving of the other spool by the tape. To prevent putting the VCR operation into fault, one gear of the kinematic chain 64 used is provided with a mechanism for delaying the reversal of the direction of rotation by about one turn.

When a conventional cassette is inserted, the tape drive mechanism, located inside the VCR, extracts the cassette tape by means of two arms to wind it on the reading capstan; the left arm is associated with a brake tensioner which, in the absence of tape prevents the rotation of the left spool and stops the VCR. The adapter cassette has to prevent the operation of this safety device. To achieve this, it is sufficient to immobilize the tensioner associated with the left arm for example with part of the adapter cassette 10 that prevents the movement of this tensioner. The shape of the cassette shall thus be slightly modified compared with the previously mentioned standard.

In conventional VHS cassettes, which are not being used in a VCR, an internal spool locking mechanism prevents unwanted unwinding of the tape. VCRs thus have, fixed on the chassis, a stud that penetrates via a hole in the cassette to unlock the internal spool locking mechanism. The adapter cassette shall thus be provided with the corresponding hole.

Figure 2:
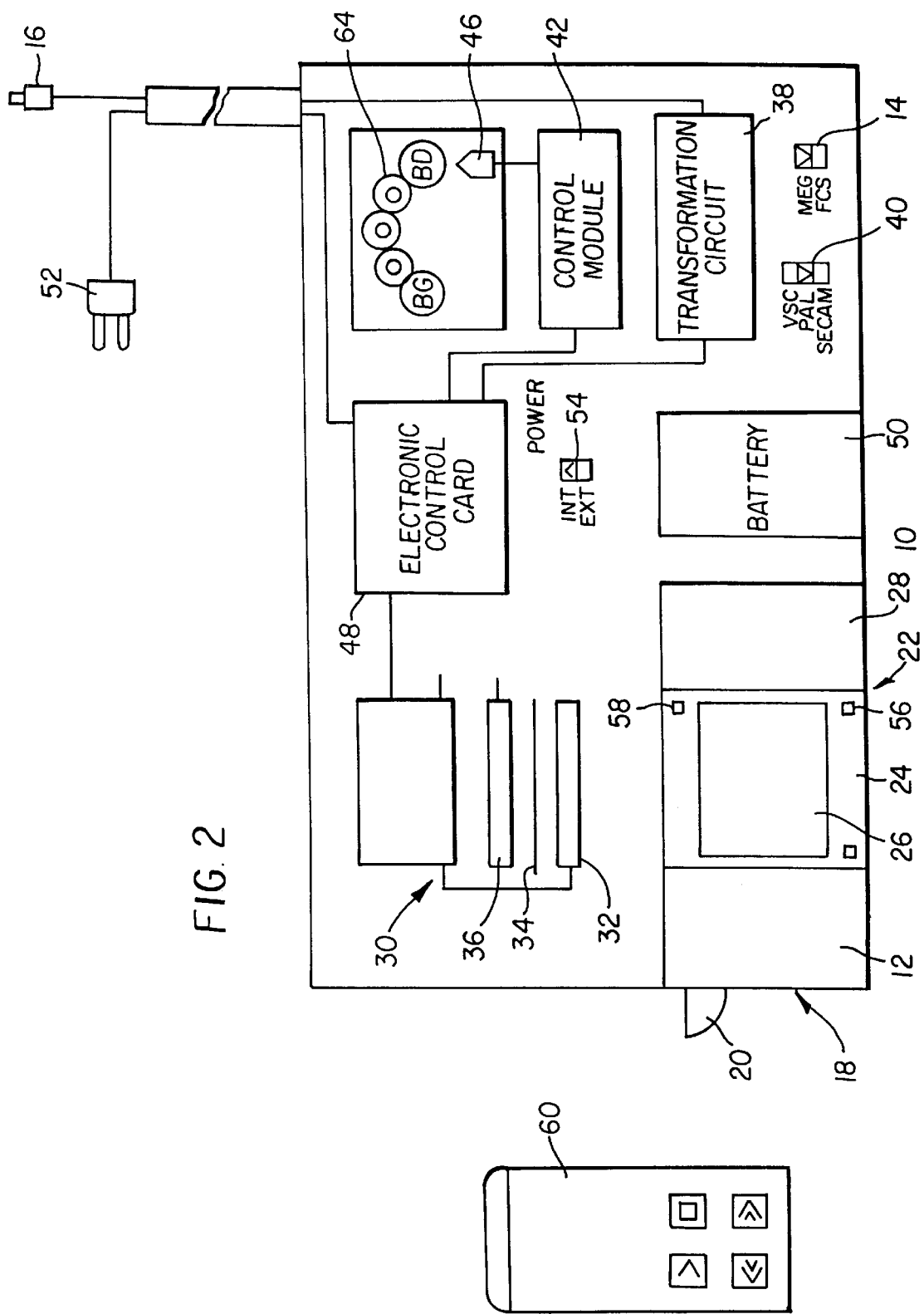
FIG. 2 represents diagrammatically the various functions required in the device according to the invention.

With reference to FIG. 2, the cooperation of the various modules constituting the invention will now be described. The present application will only mention the parts working directly with the invention. These parts can be selected from among those known to those of ordinary skill in the art to achieve the goals expected of the module. Firstly, the adapter cassette 10 comprises a reception module 18 for an APS cartridge to be displayed. This module has a loading slot 12 for an APS type cartridge. This module, as it is well known in cameras, allows an APS type cartridge to be received in a set orientation.

Advantageously, the adapter cassette 10 comprises a detection element 20 for the presence of a cartridge located inside the adapter cassette 10. This element 20 extends beyond the volume described by the adapter cassette 10 when no cartridge is introduced in the loading slot 12. The element 20 is designed to prevent the introduction of the adapter cassette 10 in the VCR when the adapter cassette 10 is empty.

A reception module 18 is associated with a transport module 22 for the film strip contained in the cartridge located in the loading slot 12. This module, as is well known, comprises a film guide 24 provided with an opening 26 and a receiving magazine 28 as well as a film drive motor (not shown). As will be shown below, an opening 26 defines an analysis position. For example assemblies developed for various types of APS® cameras can be used.

Opposite the opening 26 located in the guide 24, the adapter cassette 10 is fitted with an analysis module 30 that essentially comprises an extended diffused light source 32 to illuminate the image recorded on the strip of film 34 and a sensor 36, preferably CCD type bitmap, which enables the supply of an electrical signal representing the image. In an advantageous embodiment, the signal is transformed into a digital signal. The analysis module 30 can be substantially similar to that developed by the Eastman Kodak Company® and used in the device "Kodak Advantix Film Drive FD 300"®. This module also comprises the transport module 22 mentioned above.

The adapter cassette 10 also comprises a module 38 for transforming the signal representing the image generated by the analysis module 30 into video signal that can be used directly by the television and that is sent via the cable 16 mentioned above. Clearly the adapter cassette 10 is fitted with a transformation circuit 38 adapted to the television standard used in the sale country of the adapter cassette 10. However, several separate electric signal transformation modules can also be planned whose operation will be triggered according to the position of a switch 40 arranged on the adapter cassette 10.

The adapter cassette 10 also comprises a control module 42 whose operation is controlled by a VCR remote control 60 by means of the rotation of the spools, LS, RS. This module comprises a sensor 46 that enables detection of the direction of rotation of the spools and estimation of their speed of rotation. The operation of this module will be described below.

Finally, the adapter cassette 10 comprises an electronic control card 48 controlling the various modules and a power supply either internal by independent battery 50, or external 52 that can come to the adapter cassette 10 by a wire penetrating in the VCR through the cassette loading opening. A switch 54 allows the power supply mode of the adapter cassette 10 to be selected; clearly this switching can also be effected automatically.

The control module 42 whose operation is controlled by the VCR remote control 60 by means of the rotation of the spools, LS, RS will now be described in more detail. It has been noticed that the speed of rotation of the spools is a function of the VCR's mode of operation. VCRs usually have a standby or pause mode in which the right and left spools do not rotate, a play mode in which the right and left spools rotate at an initial speed in an initial direction corresponding to the tape advance, a fast forward play mode in which the right and left spools rotate at a second speed higher than the initial speed of rotation in the initial direction of rotation, a fast rewind play mode in which the right and left spools rotate at the second speed in a second direction the reverse of the initial direction of rotation, a fast forward mode in which the right and left spools rotate at a third speed higher than the second speed of rotation and in the initial direction of rotation and a fast rewind mode in which the right and left spools rotate at the third speed higher than the second speed of rotation and in the second direction of rotation, as well as a cassette eject mode in which the left spool rotates in the second direction of rotation to tension the tape and come to a stop as the right spool is braked. These VCR operating modes are remotely controlled by a remote control 60 that has a→ button for the play mode, a □ button for the pause or standby mode, a→→ button for the fast forward play mode when the VCR is in play mode and fast forward mode when the VCR is in standby or fast rewind mode, a←← button for the fast rewind play mode when the VCR is in play (normal or fast) and fast rewind mode when the VCR is in standby or fast forward mode. The eject mode is triggered by a button located on the VCR case. The VCR goes into standby mode when the transparent leader allows the light to pass to the previously mentioned detector. The control module 42 of the adapter cassette, according to the invention, uses the various speeds of rotation of the spools to control the various step involved in displaying the images carried by the strip of film 34 contained in the APS cartridge inserted in the slot 12 of the adapter cassette 10.

After having introduced an adapter cassette 10 in the VCR, the VCR goes into standby mode, the spools do not rotate. A press on one of the buttons of the remote control causes the spools to rotate at a set speed. In the preferred embodiment, the kinematic chain 64 interlinking the spools supplies the same speed and in the same direction to both spools. Thus it is sufficient to detect the direction of rotation and assess the speed of rotation to control the various modes of operation. The sensor 46 thus comprises two similar detection devices. Each detection device reads a repetitive design of alternating black and white fields arranged on a spool, the black fields having a different width than the white fields to supply a signal close to a pulse. The fields scanned by one of the detection devices are slightly offset from the fields scanned by the other detection device to enable detection of the direction of rotation. The number of fields scanned by one sensor 46 during a given interval of time allows the speed of rotation to be assessed. The detection signal is only transmitted to the electronic control card 48 when the speed of rotation of the spools changes.

The→ button orders the rotation of the spools at an initial transport speed which is detected by the sensor 46 previously mentioned. An order to move the strip 34 of film wound in the APS cartridge is sent to the transport module 22 of the strip by an electronic card 48 so that a first image is indexed in front of the opening 26 made in the guide using for example the detection of the perforations 56. Once the image is arranged in relation to the opening, the analysis module 30 is excited and the image sensor 36, preferably bitmap, supplies the analogue signal representing the image to the transformation module. This analogue signal is transformed into a video signal, which is sent to the television by the electrical connecting means 16 with a view to displaying the corresponding image.

When the □ button is pressed, the VCR interrupts the rotation of the spools, a signal is sent to the electronic control card 48 which stops the display of the image on the television screen.

In this embodiment, to be able to display the image recorded on the next region of the strip of film 34, first the □ button has to be pressed to stop the rotation of the spools, and the→ button is pressed again which makes the spools rotate at the initial transport speed. The previously described cycle is then repeated.

If the→→ button is pressed when the VCR is in standby mode, the spools are not rotating, the signal sent to the control card does not cause any action on the part of any of the modules. However, if the→→ button is pressed when the VCR is in play mode and the spools rotate at the initial speed, the signal coming to the video signal generating module is changed so as to display an image rotated +90°. If the←← button is pressed when the VCR is in play mode and the spools rotate at the initial speed, the signal coming to video signal generating module is changed so as to display an image rotated −90°. How this image rotation is achieved will be described below.

After the display of the image recorded on the strip of film 34, when the→ button is pressed the electronic control card 48 moves the strip of film 34. One perforation 56 arranged on one edge of the strip of film 34 and representing the end of the strip enables a contacter 58, for example a sprung blade, sliding along the edge of the strip to penetrate into the perforation 56 and close an electrical circuit. When the contacter 58 closes the electrical circuit, data is sent to the electronic control card 48 which orders rewinding of the strip 34 into the cartridge and the VCR going to standby in the manner described below.

When the←← button is pressed when the VCR is in the standby mode and the spools are not rotating, the left spool starts rotating at the third speed in the second direction of rotation and sends a corresponding signal to the electronic control card 48. The electronic control card 48 orders the rewinding of the strip of film 34 inside the cartridge and the stopping of the VCR. This stopping, or switch of the VCR to standby mode, can be obtained by allowing the luminous flux coming from the source to go through at least one of the side holes for detecting the end of the tape provided on conventional cassettes. The hole can be blocked by a moving shutter which is arranged to block the hole at rest and is moved by a signal supplied by the electronic control card 48 when the rotation of the spool in the second direction of rotation at the third speed is detected.

In an advantageous embodiment of the adapter cassette 10 according to the invention, the unlocking stud of the internal mechanism for locking the spools is used to detect the ejection of the adapter cassette by pressing on the VCR button. A suitable detector checks the presence of the stud in the adapter cassette 10. When this stud disappears, this means that the adapter cassette 10 has been removed and is being ejected. The detector sends data to the electronic control card 48 that orders the rewinding of the strip of film 34 in the APS cartridge to enable its removal from the slot 12. Clearly various safety systems that exist on APS type cameras can be used that prevent the opening of the cartridge loading slot 12 when the strip of film 34 is not rewound.

A first embodiment has just been described wherein a kinematic chain 64 interlinks both spools in order to prevent the VCR stopping in case of malfunctioning of the rotation between the two spools. An embodiment can be provided in which the spools are not linked by a kinematic chain. In the latter case, the VCR goes into standby mode after about 5 seconds. If during this period the direction and the rotation of the spools can be determined, the operation of the adapter cassette 10 can be controlled. It may be noticed that, in the operational mode, certain operational modes of the VCR cannot be triggered, which are the fast forward and rewind play modes. Furthermore, in this operational mode, detection of forward rotation (play or fast forward) only rotates the right spool while rotation in rewind (fast rewind) only rotates the left spool.

The→button will be used for the functions previously indicated, that is advance of the strip of film 34 one view, scanning of the image recorded on the strip or film 34 and display of the image. It will be noticed that there is no need to press the ☐ button to stop the rotation of the spools and that renewed pressure on the button→enables the next view to be displayed directly. The←←button will be used in the way indicated in the first embodiment to rewind the strip of film 34 in the cartridge and put the VCR into standby mode. The →→button will be used to cause the rotation of the image. However, it may be noticed that the rotation of the spools at an intermediate speed is no longer available and that successive presses on the same button should be able to display images having the four possible orientations.

Various systems for modifying the orientation of the display of the images will now be described. Firstly, the recording of data corresponding to each pixel can be envisaged and, according to the orientation required, a scanning of the memory carried out in a set order. In another embodiment, the rotation of the bitmap analysis device can be arranged; it will be interesting to provide for a return to the initial state at each movement of the strip. If the rotation of the image bitmap sensor 36 is used, the display will have to allow for the fact that the height of the television screen is less than its width. With electronic rotation this allowance can easily be obtained by suitable addressing. When the rotation of a sensor 36 is used, to prevent any data loss the image projected onto the sensor 36 will have to be reduced so that its length corresponds to the width of the sensor. To achieve this, when the sensor 36 rotates either one optical system can be replaced with another optical system, or the position of one or more lenses can be modified, or an additional lens can be introduced at a set position in the light path. Mirrors can be used to bend the optical beam and thus reduce the field angles of the optical systems.

In certain embodiments, a device for recognizing the type of film, sensitivity, and origin, can be introduced into the adapter cassette 10, in order to allow for the hue of the colored or masked base and apply a correction to the signals coming from the image sensor 36. This device can be a device for reading data encoded in APS type products, or analysis devices that are known and used on some photographic printers to automatically detect the hue of the mask and to work out the correction to provide.

When using APS type products, the encoded data relating to the image to be displayed and enabling the display format to be encoded can be allowed for.

In the analysis module 30 described above, the image sensor 36 has been described as a CCD type bitmap sensor. This type of sensor 36 can be replaced by a linear sensor, for example of CCD type, associated with controlled movement of the strip of film 34 in order to obtain scanning of the image. A stepped motor can obtain movement of the strip of film 34 and the signals can be memorized in order to be able to maintain the display on the television screen.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 adapter cassette
12 loading slot
14 switch
16 electrical connecting means
18 reception module
20 detection element
22 transport module
24 film guide
26 opening
28 receiving magazine
30 analysis module
32 light source
34 strip of film
36 sensor
38 transformation circuit
40 switch
42 control module
46 sensor
48 electronic control card
50 battery
52 external power supply
54 switch
56 perforations
58 contacter
60 VCR remote control
64 kinematic chain

What is claimed is:

1. An adapter cassette to display on a television screen, images recorded on a strip of photographic film, by means of a video cassette recorder (VCR), comprising:

a) means for receiving a reel on which is wound a strip of photographic film having photographic images recorded thereon;

b) transport means run by the operation of the VCR to control the position of the strip of film at least partially wound on the reel in relation to a position of analysis; and c) means for analysis and transformation of the signal to provide a video signal representing the image carried by the strip of film and located in front of the analysis position.

2. The adapter cassette according to claim 1 further comprising:

two spools free to rotate;

a detector of rotation to estimate the speed of rotation and determine the direction of rotation of the spools and generate a signal representing the rotation of the spools; and electronics to, according to the signal representing the state of rotation of the spools, order the transport of the strip of film in relation to the analysis unit.

3. The adapter cassette according to claim 2 wherein the spools are interlinked by a kinematic chain so that the rotation of one of the spools caused the rotation of the other, the kinematic chain having a mechanism for delaying the reversal of the direction of rotation.

4. The adapter cassette according to claim 1 wherein the means for receiving the reel are associated with an element for detecting the presence of a reel in order to increase its external dimensions when no reel is contained in the cassette.

5. The adapter cassette according to claim 1 comprising switching means enabling the type of strip of film wound on the reel to be selected.

6. The adapter cassette according to claim 1 wherein the analysis means comprise a light source arranged opposite one face of the strip and a CCD sensor opposite the other face.

7. The adapter cassette according to claim 6 comprising:

an optical system for forming on the CCD sensor, which is a two-dimensional sensor, an image of the strip of film; and a means to modify the enlargement of the image formed by the optical system in order to match the length of the image to the width of the sensor and rotate the sensor 90° in its plane.

8. The adapter cassette according to claim 1 wherein the strip of film wound on a reel is contained in an APS type cartridge and comprising a reading device for the data relating to the strip of film contained in the cartridge to modify the data obtained by scanning.

9. A VCR adapted to receiving a cassette according to claim 1 fitted with recognition means and connection means, comprising:

a detector of the recognition means carried by the cassette; and a connection means for, when the cassette is introduced into the VCR, interlinking the connection means of the cassette and the VCR in order to direct the VCR control signals to the cassette.

* * * * *